(12) United States Patent
Jeon

(10) Patent No.: US 12,017,366 B1
(45) Date of Patent: Jun. 25, 2024

(54) PALLETIZING SYSTEM

(71) Applicant: BRILS Co., Ltd., Incheon (KR)

(72) Inventor: Jin Jeon, Incheon (KR)

(73) Assignee: BRILS Co., Ltd., Incheon (KR)

( * ) Notice: Subject to any disclaimer, the term of this patent is extended or adjusted under 35 U.S.C. 154(b) by 0 days.

(21) Appl. No.: 18/535,621

(22) Filed: Dec. 11, 2023

(30) Foreign Application Priority Data

Jan. 26, 2023 (KR) ........................ 10-2023-0010371

(51) Int. Cl.
*B25J 9/16* (2006.01)
*B25J 5/00* (2006.01)
*B25J 13/08* (2006.01)
*B25J 15/06* (2006.01)
*B65G 57/04* (2006.01)

(52) U.S. Cl.
CPC ............. *B25J 9/1676* (2013.01); *B25J 5/007* (2013.01); *B25J 13/086* (2013.01); *B25J 15/0625* (2013.01); *B65G 57/04* (2013.01)

(58) Field of Classification Search
CPC ........ B25J 9/1676; B25J 5/007; B25J 13/086; B25J 15/0625; B65G 57/04
See application file for complete search history.

(56) References Cited

U.S. PATENT DOCUMENTS 5,984,623 A 11/1999 Smith et al.
2023/0286140 A1* 9/2023 Usui ..................... B25J 9/1653

FOREIGN PATENT DOCUMENTS

| KR | 10-1993-0007596 A | 5/1993 |
| KR | 10-2018-0109107 A | 10/2018 |
| KR | 10-2021-0096615 A | 8/2021 |
| KR | 10-2425921 B1 | 7/2022 |

* cited by examiner

*Primary Examiner* — Basil T. Jos
(74) *Attorney, Agent, or Firm* — Bridgeway IP Law Group, PLLC; Jihun Kim

(57) ABSTRACT

A palletizing system includes: a system casing which is positioned on one side of a pallet for loading goods; an actuator lift which is installed above the system casing, and extends or contracts in the vertical direction; a collaborative robot which is a multi-joint robot formed to load goods onto the pallet, is connected and installed on the top of the actuator lift to be vertically lifted and moved by the actuator lift; a vacuum suction-type gripper which is installed at the end of the collaborative robot, and fastens goods using vacuum; radar sensors, which are respectively installed on at least one side of the system casing, and sense objects within a predetermined distance of the system casing; and a main controller which controls the operations of the actuator lift, the collaborative robot, and the vacuum suction-type gripper to load goods onto the pallet.

5 Claims, 9 Drawing Sheets

PALLETIZING SYSTEM

CROSS-REFERENCE TO RELATED APPLICATIONS

This application claims the priority of Korean Patent Application No. 10-2023-0010371 filed on Jan. 26, 2023, in the Korean Intellectual Property Office, the disclosure of which is incorporated herein by reference.

BACKGROUND OF THE INVENTION

Field of the Invention

The present disclosure relates to a palletizing system, and more specifically, to a palletizing system which can stably load box-type goods onto a pallet using a multi-joint robot having a vacuum suction-type lightweight gripper.

Background Art

Palletizing refers to the operation of loading goods onto a pallet, and palletizing/depalletizing means a technology in which a robot performs work for loading boxes on pallets (cargo carriers), which was performed manually, that is, refers to the operation that robots perform repetitive and simple tasks in the field.

Conventional robot devices used for palletizing have disadvantages in that the robot devices or the goods being moved could be damaged due to obstacles that may exist within the working area.

Meanwhile, the aforementioned background art is technical information that the inventor had for deducing the present disclosure or acquired during the deduction process of the present disclosure, and cannot necessarily be considered as publicly known technology disclosed to the general public before the filing of the present disclosure.

PATENT LITERATURE

Patent Documents

Patent Document 1: Korean Patent No. 10-2425921 (published on Jul. 28, 2022)
Patent Document 2: Korean Patent Publication No. 10-1993-0007596 (published on May 20, 1993)

SUMMARY OF THE INVENTION

Accordingly, the present disclosure has been made to solve the above-mentioned problems occurring in the prior arts, and it is an objective of the present disclosure to provide a palletizing system which can stably load box-type goods onto a pallet using a multi-joint robot having a vacuum suction-type lightweight gripper.

The objectives of the present disclosure are not limited to those mentioned above, and other objectives not mentioned herein will be clearly understood by those skilled in the art from the following description.

To accomplish the above object, according to the present disclosure, there is provided a palletizing system including: a system casing which is positioned on one side of a pallet for loading goods; an actuator lift which is installed above the system casing, and extends or contracts in the vertical direction; a collaborative robot which is a multi-joint robot formed to load goods onto the pallet, is connected and installed on the top of the actuator lift to be vertically lifted and moved by the actuator lift; a vacuum suction-type gripper which is installed at the end of the collaborative robot, and fastens goods using vacuum; radar sensors, which are respectively installed on at least one side of the system casing, and sense objects within a predetermined distance of the system casing; and a main controller which controls the operations of the actuator lift, the collaborative robot, and the vacuum suction-type gripper to load goods onto the pallet positioned on one side of the system casing, using sensing information transmitted from the radar sensors.

In an embodiment, the vacuum suction-type gripper includes: a gripper body which is installed at the end of the collaborative robot; a plurality of suction units which is formed in a sucker shape, is installed along the bottom side of the gripper body to fasten goods using vacuum; an air control valve which sucks air from the suction units to create a vacuum; and an air pressure switch which senses the negative pressure formed in the suction units and controls the operation of the air control valve.

In an embodiment, the vacuum suction-type gripper further includes a collision prevention module which is installed to surround the sides of the gripper body to prevent collision of the gripper body.

In an embodiment, the collision prevention module includes: a ring-shaped collision prevention part which is formed in a circular ring shape, and is arranged to surround each side of the gripper body; a first buffer support part which is installed on the front surface of the gripper body to support the inward surface of the front end of the ring-shaped collision prevention part; a second buffer support part which is installed on one side of the gripper body to support the inward surface of one side of the ring-shaped collision prevention part; a third buffer support part which faces the second buffer support part and is installed on the opposite side of the gripper body to support the inward surface of the other side of the ring-shaped collision prevention part; and a fourth buffer support part which faces the first buffer support part and is installed on the rear surface of the gripper body to support the inward surface of the rear end of the ring-shaped collision prevention part.

In an embodiment, the ring-shaped collision prevention part includes: a first ring-shaped frame which is formed in a circular ring shape, and has an upper end and a lower end which are respectively bent inwards in the horizontal direction and then further bent in the orthogonal direction to face each other; a second ring-shaped frame which is formed in a circular ring shape, and includes an upper end seating groove extending along the upper end thereof for placing the upper end of the first ring-shaped frame thereon and a lower end seating groove extending along the lower end thereof for placing the lower end of the first ring-shaped frame thereon; a plurality of frame spacing support parts which are installed along the outward surface of the second ring-shaped frame at regular intervals to support the interval between the inward surface of the first ring-shaped frame and the outward surface of the second ring-shaped frame and to buffer vibration or impact transmitted from the first ring-shaped frame; a plurality of rotation induction parts which are installed along the outward surface of the second ring-shaped frame at regular intervals, forms a pair with the frame spacing support part, extends in an inclination direction by the frame spacing support parts as the interval between the inward surface of the first ring-shaped frame and the outward surface of the second ring-shaped frame decreases due to an external impact applied onto the first ring-shaped frame, thereby inducing the rotation of the first ring-shaped frame; a plurality of upper close contact parts which are installed along the upper end seating groove at regular intervals to support the vertical surface of the upper end of the first ring-shaped frame seated on the upper end seating groove; and a plurality of lower close contact parts which are installed along the lower end seating groove at regular intervals to support the vertical surface of the lower end of the first ring-shaped frame seated on the lower end seating groove.

In an embodiment, the frame spacing support part includes: a support part installation groove which is formed on the outward surface of the second ring-shaped frame; a support block which is placed on the support part installation groove; a support sphere which is rotatably connected to the front end of the support block exposed from the support part installation groove and is seated on the inward surface of the first ring-shaped frame to support the first ring-shaped frame; a block support spring which is installed on the support part installation groove to support the inside of the support block; a spring support plate which is installed inside the support part installation groove to be located more inward than the block support spring to support the block support spring; and a plate support cylinder which is installed inside the support part installation groove to support the spring support plate, is compressed by the block support spring compressed as the support block is inserted inward into the support part installation groove to supply a fluid contained within the internal space to the rotation induction part.

In an embodiment, the rotation induction part includes: a cylinder seating groove which is formed on the outward surface of the second ring-shaped frame; a rotating cylinder which has one end connected to the inside of the cylinder seating groove to be rotatable and is arranged to be inclined; a piston which is installed inside the rotating cylinder, is moved forwards as fluid is supplied from the plate support cylinder to the rotating cylinder; a piston rod which is installed at the front end of the piston, has a front end arranged to be exposed forward from the rotating cylinder, is caught to a retaining jaw formed along the inward surface of the first ring-shaped frame as the piston moves forward inside the rotating cylinder to be exposed from the rotating cylinder, and then, is pushed to rotate the first ring-shaped frame; a first return spring which is installed at the front end inside the space of the rotating cylinder to support the front end of the piston and return the piston moved forward by hydraulic pressure to its original position; and a second return spring which is installed on one side of the cylinder seating groove to support one side of the rotating cylinder and return the rotated rotating cylinder to its original position.

In an embodiment, the upper close contact part includes: a first upper support sphere which is rotatably connected to the outside of the upper seating groove to support the outside of the vertical surface of the upper end of the first ring-shaped frame; an upper installation groove which is formed inside the upper seating groove to face the first upper support sphere; an upper support block which is seated on the upper installation groove; an upper support spring which is installed inside the upper installation groove to support the upper support block; and a second upper support sphere which is rotatably connected to the front end of the upper support block to support the inside of the vertical surface of the upper end of the first ring-shaped frame.

In an embodiment, the first buffer support part includes: a horizontal sliding rail which is installed on the inward surface of the front end of the second ring-shaped frame; a vertical sliding rail which is installed on the front surface of the gripper body to face the horizontal sliding rail; a horizontal frame which is extended in a "—" shape to be connected to a horizontal rail groove extending in the left-right horizontal direction along the inside of the horizontal sliding rail, thereby enabling sliding movement in the left-right horizontal direction; a vertical frame which is extended to be orthogonal in a "|" shape from the rear end of the horizontal frame to be connected to a vertical rail groove extending in the back-and-forth vertical direction along the inside of the vertical sliding rail, thereby enabling sliding movement in the back-and-forth vertical direction; two horizontal support springs which are respectively installed on both sides of the horizontal rail groove to support both sides of the horizontal frame seated on the horizontal rail groove; and two vertical support springs which are respectively installed at the front and rear ends of the vertical rail groove, and support the front and rear ends of a frame head, which is formed to correspond to the cross-sectional shape of the vertical rail groove, placed on the vertical rail groove, and is installed at the bottom of the vertical frame.

According to one aspect of the present disclosure, the palletizing system can stably load box-type goods onto a pallet using a multi-joint robot having a vacuum suction-type lightweight gripper.

Additionally, according to one aspect of the present disclosure, the palletizing system can be used without a safety fence, can be freely moved and installed in the workspace regardless of working spaces, and can effectively prevent damage to the robot or the goods being moved due to obstacles that may exist within the working area.

The advantages of the present disclosure are not limited to the above-mentioned advantages, and other advantages, which are not specifically mentioned herein, will be clearly understood by those skilled in the art from the following description.

DETAILED DESCRIPTION OF THE PREFERRED EMBODIMENT

Figure 1:
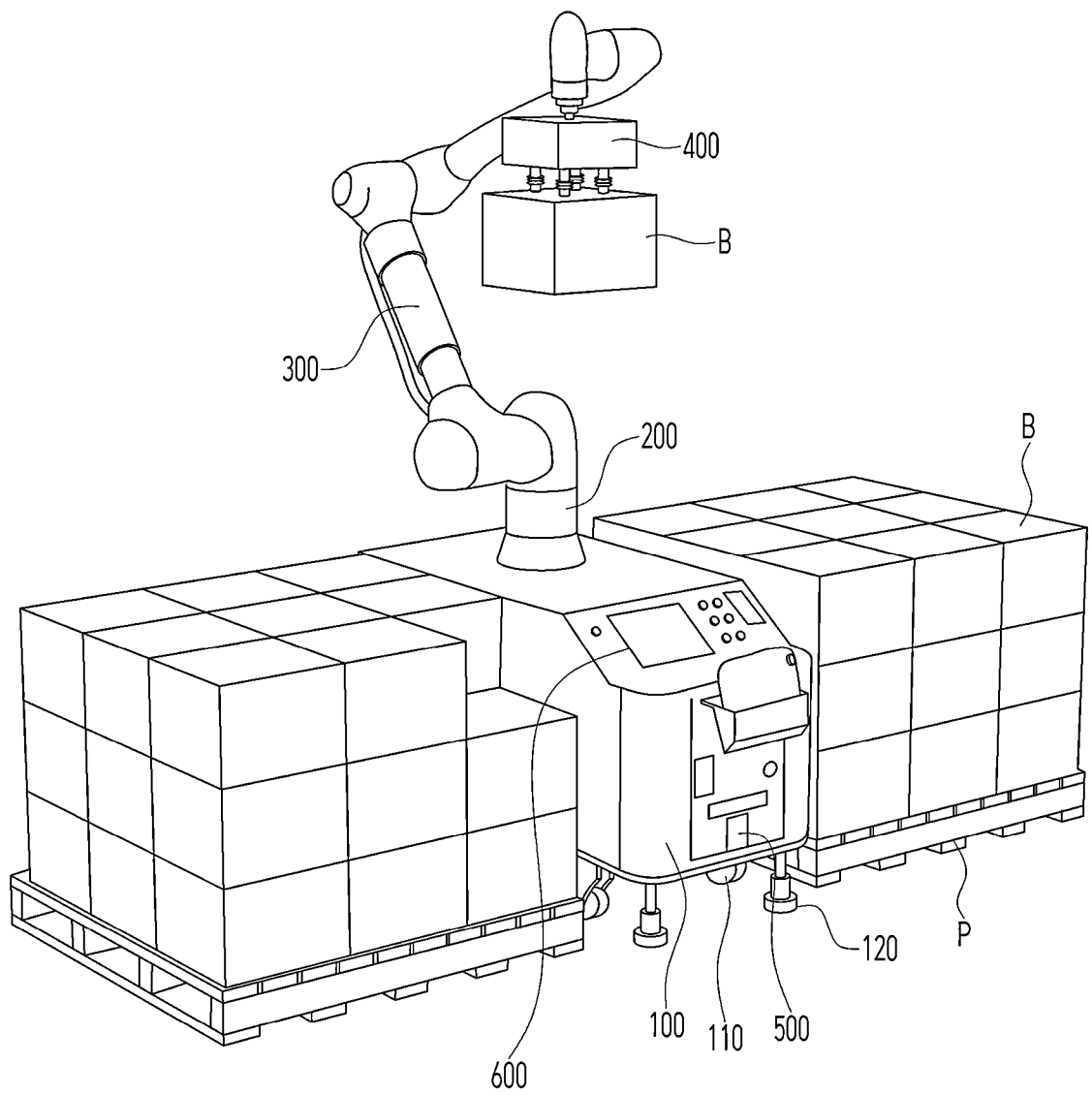
FIGS. 1 and 2 are schematic diagrams of a palletizing system according to an embodiment of the present disclosure.

Specific embodiments of the present disclosure are described in detail below with reference to the accompanying drawings. The embodiments are described in detail in order for those skilled in the art to readily implement the present disclosure. It is to be understood that the various embodiments of the present disclosure are different from each other, but do not need to be exclusive. For example, a specific shape, structure and characteristic described in this specification in connection with an embodiment may be implemented as another embodiment without departing from the spirit and scope of the present disclosure. It is also to be understood that the position or arrangement of an individual element within each disclosed embodiment may be changed without departing from the spirit and scope of the present disclosure. Accordingly, the detailed description hereinafter is not intended to have a limited meaning, and the range of right of the present disclosure is restricted by only the attached claims along with the entire range equivalent to things claimed by the claims, if it is appropriately described. Similar reference numerals in the drawings denote the same or similar functions from several aspects.

Hereinafter, the preferred embodiments of the present disclosure will be described in more detail with reference to the drawings.

Figure 2:
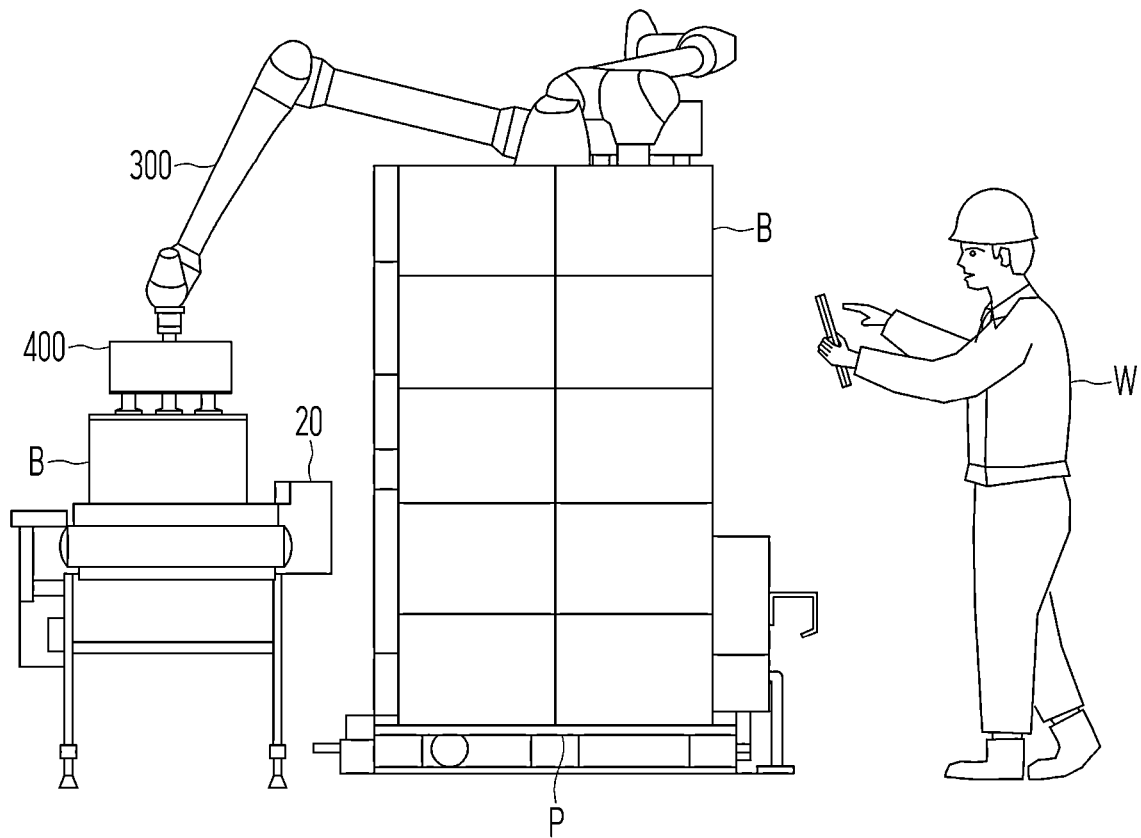

FIGS. 1 and 2 are schematic diagrams of a palletizing system according to an embodiment of the present disclosure.

Referring to FIGS. 1 and 2, the palletizing system 10 according to an embodiment of the present disclosure includes a system casing 100, an actuator lift 200, a collaborative robot 300, a vacuum suction-type gripper 400, a radar sensor 500, and a main controller 600.

The system casing 100 is arranged on one side of a pallet (P) for loading goods (B), and the actuator lift 200, the collaborative robot 300, the radar sensor 500, and the main controller 600 are mounted on the system casing 100.

In an embodiment, the system casing 100 may include: wheels 110 installed along the bottom of the system casing for movement; and a vertically expandable and contractible stand 120 which is provided along the bottom thereof for fixation after movement.

The actuator lift 200, which is a servo actuator lift, is installed on the top of the system casing 100, and is vertically expandable and contractible by the main controller 600 to move the collaborative robot 300 in a vertical direction.

The collaborative robot 300 is a multi-joint robot formed to load goods (B) onto a pallet (P), is connected and installed on the top of the actuator lift 200 to be vertically lifted and moved by the actuator lift 200, and is driven by the main controller 600.

In an embodiment, the collaborative robot 300 can carry the goods (B) with the maximum load of 25 kg and in the maximum working radius of 1700 mm, and can stack goods (B) up to the maximum height of 2.2 m.

The vacuum suction-type gripper 400 is installed at the end of the collaborative robot 300, and is driven by the main controller 600 to fasten various types of box-shaped goods (B) weighing up to 3 kg using vacuum.

The radar sensor 500 is installed on at least one side of the system casing 100 to sense the goods within a predetermined distance of the system casing 100, and transmits sensed information to the main controller 600.

In an embodiment, the radar sensor 500 is installed to prevent accidents caused by equipment around the collaborative robot 300 during operation. If a worker approaches the sensor, the sensor transmits a signal to the main controller 600 to temporarily stop the collaborative robot 300, and if the worker moves away, the sensor cuts off the signal to resume the operation of the collaborative robot 300.

The main controller 600 controls the operations of the actuator lift 200, the collaborative robot 300, and the vacuum suction-type gripper 400 to load goods (B) onto the pallet (P) placed on one side of the system casing 100 by using the sensing information transmitted from the radar sensor 500.

In an embodiment, for the main controller 600, a windows-based touch PC may be applied, and palletizing operation setting software may be embedded in the main controller.

The palletizing system 10 of the present disclosure, having the configuration as described above, can stably load box-type goods onto a pallet using a multi-joint robot having a vacuum suction-type lightweight gripper.

Additionally, according to one aspect of the present disclosure, the palletizing system can be used without a safety fence, can be freely moved and installed in the workspace regardless of working spaces, and can effectively prevent damage to the robot or the goods being moved due to obstacles that may exist within the working area.

Figure 3:
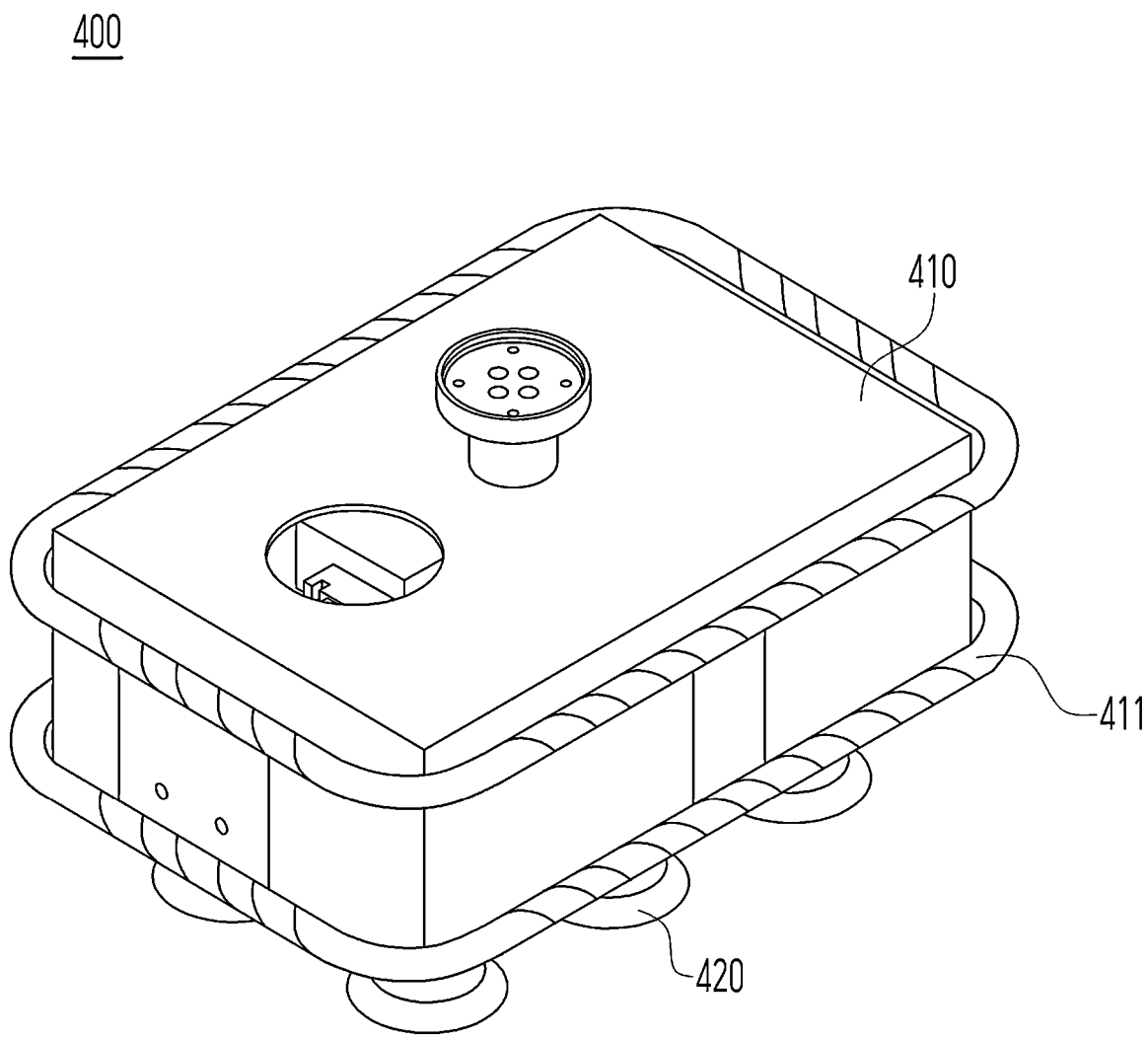
FIGS. 3 and 4 are views illustrating a vacuum suction-type gripper of FIG. 1.
Figure 4:
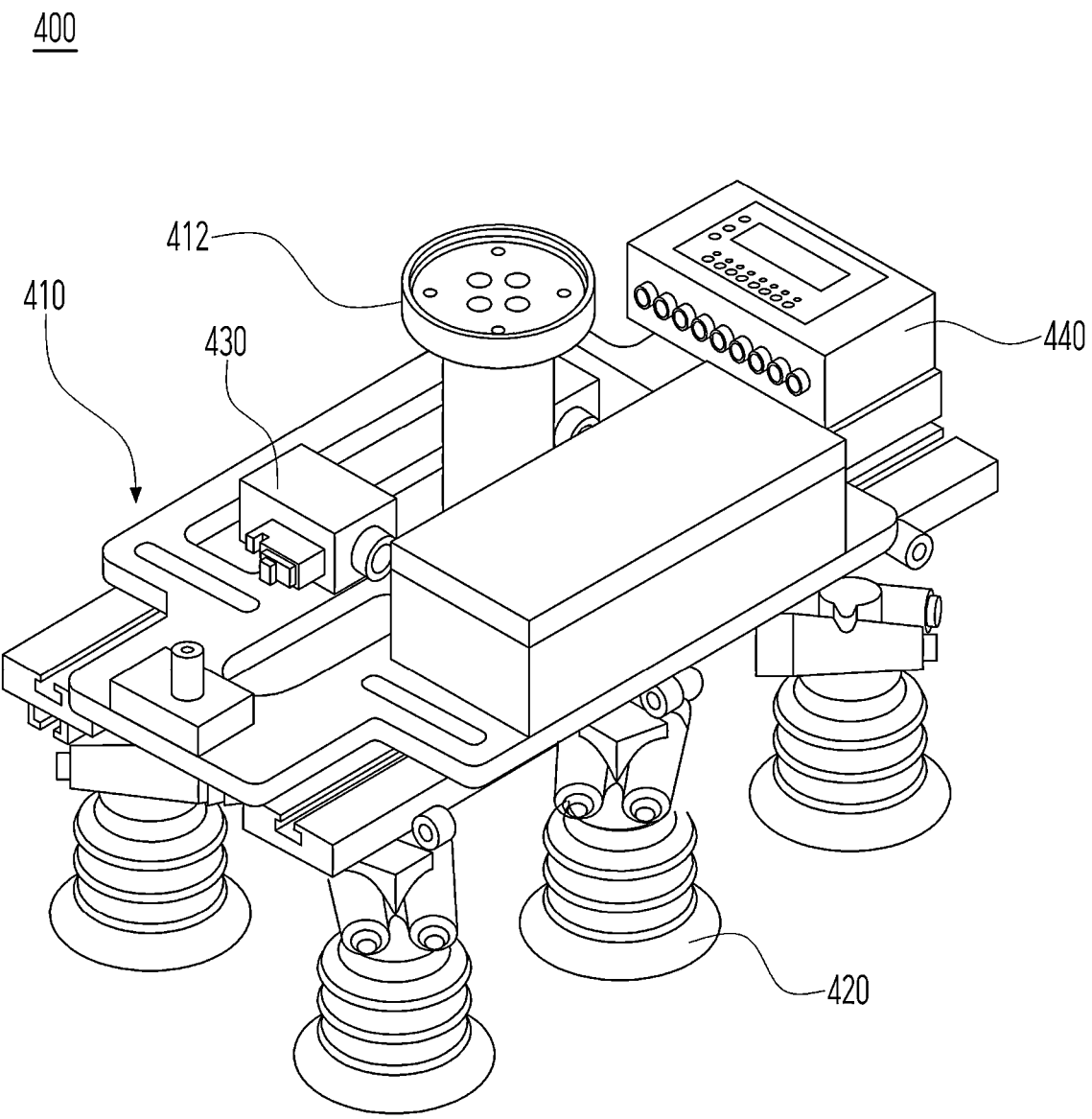

FIGS. 3 and 4 are views illustrating the vacuum suction-type gripper of FIG. 1.

Referring to FIGS. 3 and 4, the vacuum suction-type gripper 400 includes a gripper body 410, a plurality of suction units 420, an air control valve 430, and an air pressure switch 440.

The gripper body 410 is installed at the end of the collaborative robot 300, and the plurality of suction units 420, the air control valve 430, and the air pressure switch 440 are installed on the gripper body.

In an embodiment, the gripper body 410 has at least one guide bar 411 installed around the gripper body to prevent collision with other goods.

The plurality of suction units 420, preferably, six suction units, are formed in the shape of a sucker, are installed along the bottom side of the gripper body 410, and fasten the contacted goods (B) by using the vacuum created by the air control valve 430.

The air control valve 430 sucks air from the suction units 420 to create a vacuum.

The air pressure switch 440 senses the negative pressure level formed in the suction units 420, and controls the operation of the air control valve 430.

In an embodiment, the air pressure switch 440 is installed on the gripper body 410 to monitor the air pressure of the air control valve 430. When the air pressure of the air control valve 430 drops below a set value, the switch can transmit a signal to a PLC to stop the operation of the equipment, thereby protecting the equipment and people.

Figure 5:
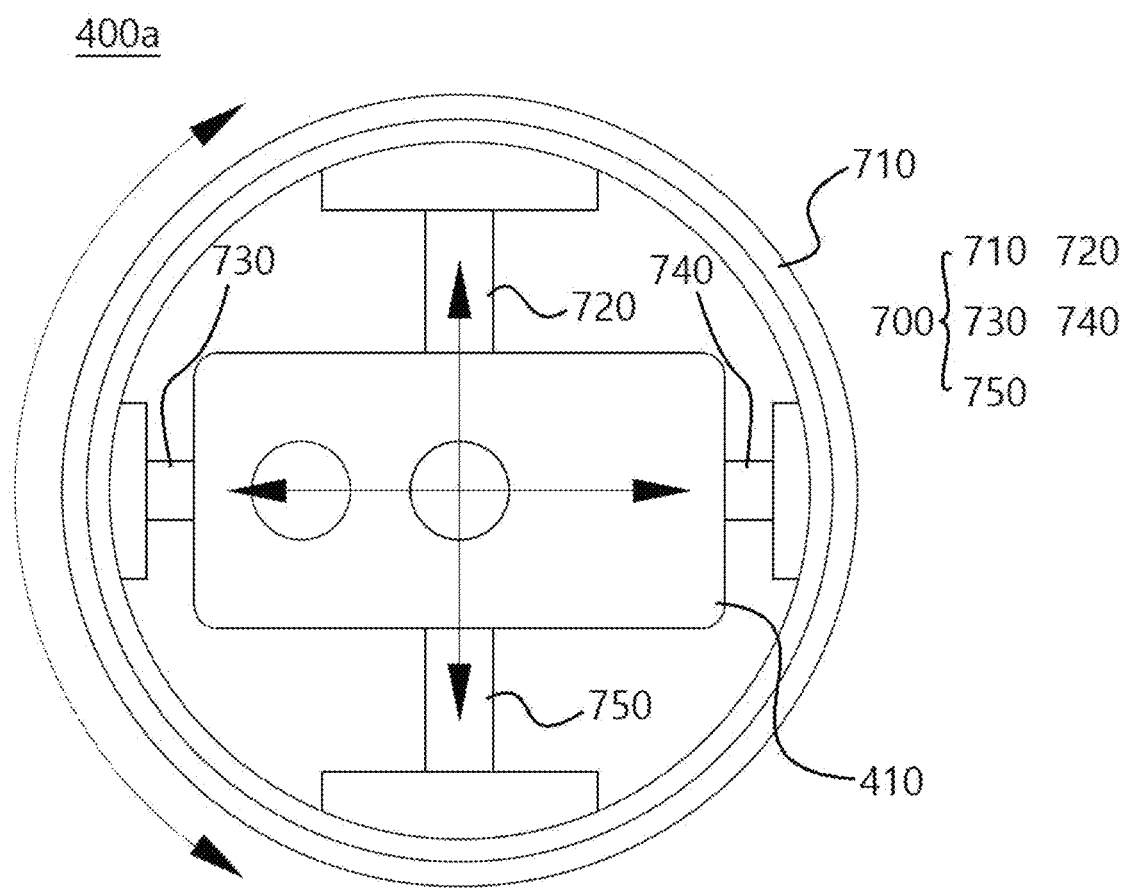
FIG. 5 is a view illustrating another example of the vacuum suction-type gripper of FIG. 1.

FIG. 5 is a view illustrating another example of the vacuum suction-type gripper of FIG. 1.

Referring to FIG. 5, the vacuum suction-type gripper 400a according to another example includes a gripper body 410, a plurality of suction units 420, an air control valve 430, an air pressure switch 440, and a collision prevention module 700.

Here, the gripper body 410, the multiple suction units 420, the air control valve 430, and the air pressure switch 440 are the same as the components in FIG. 4, so their descriptions will be omitted.

The collision prevention module 700 is installed to surround the side of the gripper body 410 to prevent collision of the gripper body 410.

In an embodiment, the collision prevention module 700 may include a ring-shaped collision prevention part 710, a first buffer support part 720, a second buffer support part 730, a third buffer support part 740, and a fourth buffer support part 750.

The ring-shaped collision prevention part 710 is formed in a circular ring shape, is supported by the first buffer support part 720, the second buffer support part 730, the third buffer support part 740, and the fourth buffer support part 750, and is arranged to surround and be arranged on each side of the gripper body 410.

The first buffer support part 720 is installed on the front side of the gripper body 410, and supports the inward surface of the front end of the ring-shaped collision prevention part 710.

The second buffer support part 730 is installed on one side of the gripper body 410, and supports the inward surface of one side of the ring-shaped collision prevention part 710.

The third buffer support part 740 is installed on the the other side of the gripper body 410 to face the second buffer support part 730, and supports the inward surface of the other side of the ring-shaped collision prevention part 710.

The fourth buffer support part 750 is installed on the the rear side of the gripper body 410 to face the first buffer support part 720, and supports the inward surface of the rear end of the ring-shaped collision prevention part 710.

The vacuum suction-type gripper 400a according to another example, having the configuration as described above, can protect all sides of the gripper body 410 using the collision prevention module 700, thereby effectively preventing the separation or damage of the goods (B) from the plurality of suction units 420 due to the external collision of the gripper body 410.

Figure 6:
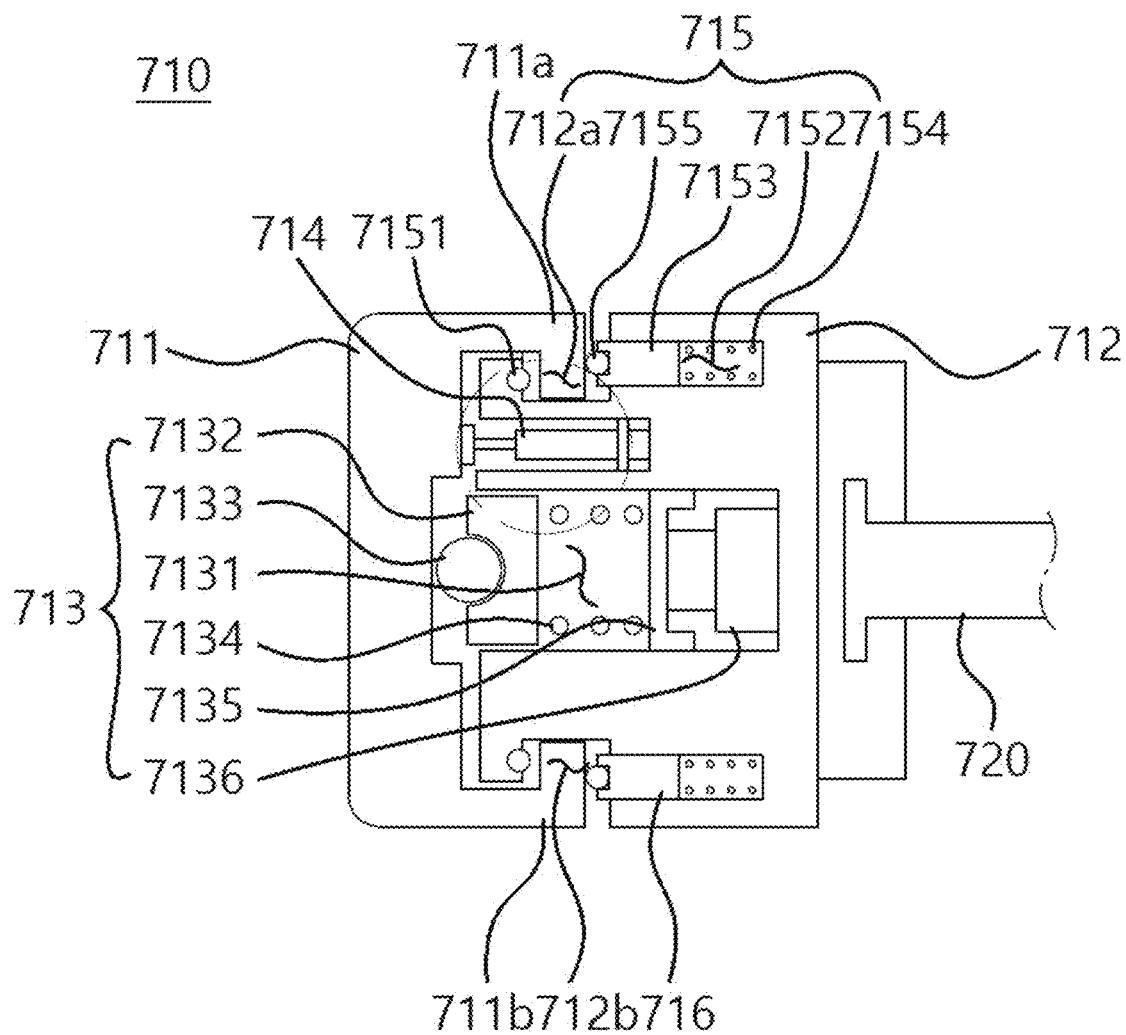
FIG. 6 is a view illustrating a ring-shaped collision prevention part of FIG. 5.

FIG. 6 is a view illustrating the ring-shaped collision prevention part of FIG. 5.

Referring to FIG. 6, the ring-shaped collision prevention part 710 includes a first ring-shaped frame 711, a second ring-shaped frame 712, a frame spacing support part 713, a rotation induction part 714, an upper close contact part 715, and a lower close contact part 716.

The first ring-shaped frame 711 is formed in a circular ring shape, and has an upper end 711a and a lower end 711b which are respectively bent inwards in the horizontal direction and then further bent in the orthogonal direction to face each other, thereby being connected to be rotatable along the outer circumferential surface of the second ring-shaped frame 712.

The second ring-shaped frame 712 is formed in a circular ring shape, has the inner circumferential surface supported by the first buffer support part 720, the second buffer support part 730, the third buffer support part 740, and the fourth buffer support part 750, and in order to rotatably connect the inward surface of the first ring-shaped frame 711 to the outward surface thereof, includes: an upper end seating groove 712a extending along the upper end thereof for placing the upper end 711a of the first ring-shaped frame 711 thereon; and a lower end seating groove 712b extending along the lower end thereof for placing the lower end 711b of the first ring-shaped frame 711 thereon. Additionally, the components such as the frame spacing support part 713, the rotation induction part 714, the upper close contact part 715, and the lower close contact part 716 are installed on the second ring-shaped frame 712.

The plurality of frame spacing support parts 713 are installed along the outward surface of the second ring-shaped frame 712 at regular intervals to support the interval between the inward surface of the first ring-shaped frame 711 and the outward surface of the second ring-shaped frame 712 and to buffer vibration or impact transmitted from the first ring-shaped frame 711.

In an embodiment, the frame spacing support part 713 may include a support part installation groove 7131, a support block 7132, a support sphere 7133, a block support spring 7134, a spring support plate 7135, and a plate support cylinder 7136.

The support part installation groove 7131 is formed on the outward surface of the second ring-shaped frame 712.

The support block 7132 is supported by the block support spring 7134 and is placed on the support part installation groove 7131.

The support sphere 7133 is rotatably connected to the front end of the support block 7132 exposed from the support part installation groove 7131 and is seated on the inward surface of the first ring-shaped frame 711 to support the first ring-shaped frame 711 and to reduce friction between the first ring-shaped frame 711 and the second ring-shaped frame 712.

The block support spring 7134 is supported by the spring support plate 7135 and is installed on the support part installation groove 7131 to support the inside of the support block 7132.

The spring support plate 7135 is supported by the plate support cylinder 7136 and is installed inside the support part installation groove 7131 to be located more inward than the block support spring 7134, to support the block support spring 7134.

The plate support cylinder 7136 is installed inside the support part installation groove 7131 to support the spring support plate 7135, is compressed by the block support spring 7134 compressed as the support block 7132 is inserted inward into the support part installation groove 7131, to supply a fluid, such as water or oil, contained within the internal space to the rotation induction part 714.

The plurality of rotation induction parts 714 are installed along the outward surface of the second ring-shaped frame 712 at regular intervals, forms a pair with the frame spacing support part 713, extends in an inclination direction by the frame spacing support part 713 as the interval between the inward surface of the first ring-shaped frame 711 and the outward surface of the second ring-shaped frame 712 decreases due to an external impact applied onto the first ring-shaped frame 711, thereby inducing the rotation of the first ring-shaped frame 711.

The plurality of upper close contact parts 715 are installed along the upper end seating groove 712a at regular intervals to support the vertical surface 711a of the upper end of the first ring-shaped frame 711 seated on the upper end seating groove 712a.

In an embodiment, the upper close contact part 715 may include a first upper support sphere 7151, an upper installation groove 7152, an upper support block 7153, an upper support spring 7154, and a second upper support sphere 7155.

The first upper support sphere 7151 is rotatably connected to the outside of the upper seating groove 712a to support the outside of the vertical surface 711a of the upper end of the first ring-shaped frame 711.

The upper installation groove 7152 is formed inside the upper seating groove 712a to face the first upper support sphere 7151.

The upper support block 7153 is supported by the upper support spring 7154 and is seated on the upper installation groove 7152.

The upper support spring 7154 is installed inside the upper installation groove 7152 to support the upper support block 7153.

The second upper support sphere 7155 is rotatably connected to the front end of the upper support block 7153 to support the inside of the vertical surface 711a of the upper end of the first ring-shaped frame 711.

The plurality of lower close contact parts 716 are installed along the lower seating groove 712b at regular intervals to support the vertical surface 711b of the lower end of the first ring-shaped frame 711 seated on the lower seating groove 712b.

Here, the lower close contact part 716 has the same configuration as the upper close contact part 715, and the components such as the first upper support sphere 7151, the upper installation groove 7152, the upper support block 7153, the upper support spring 7154, and the second upper support sphere 7155 of the upper close contact part 715 can be applied to the lower close contact part 716 in the same way. Accordingly, to avoid repeated description, the description of the components will be omitted.

The ring-shaped collision prevention part 710 having the configuration described above can prevent the external collision of the gripper body 410 since the first ring-shaped frame 711 and the second ring-shaped frame 712 are arranged to surround the perimeter of the gripper body 410. Additionally, when an external impact is applied to the first ring-shaped frame 711, the first ring-shaped frame 711 rotates to buffer the external impact, thereby minimizing vibration or impact which may be transmitted to the gripper body 410.

Figure 7:
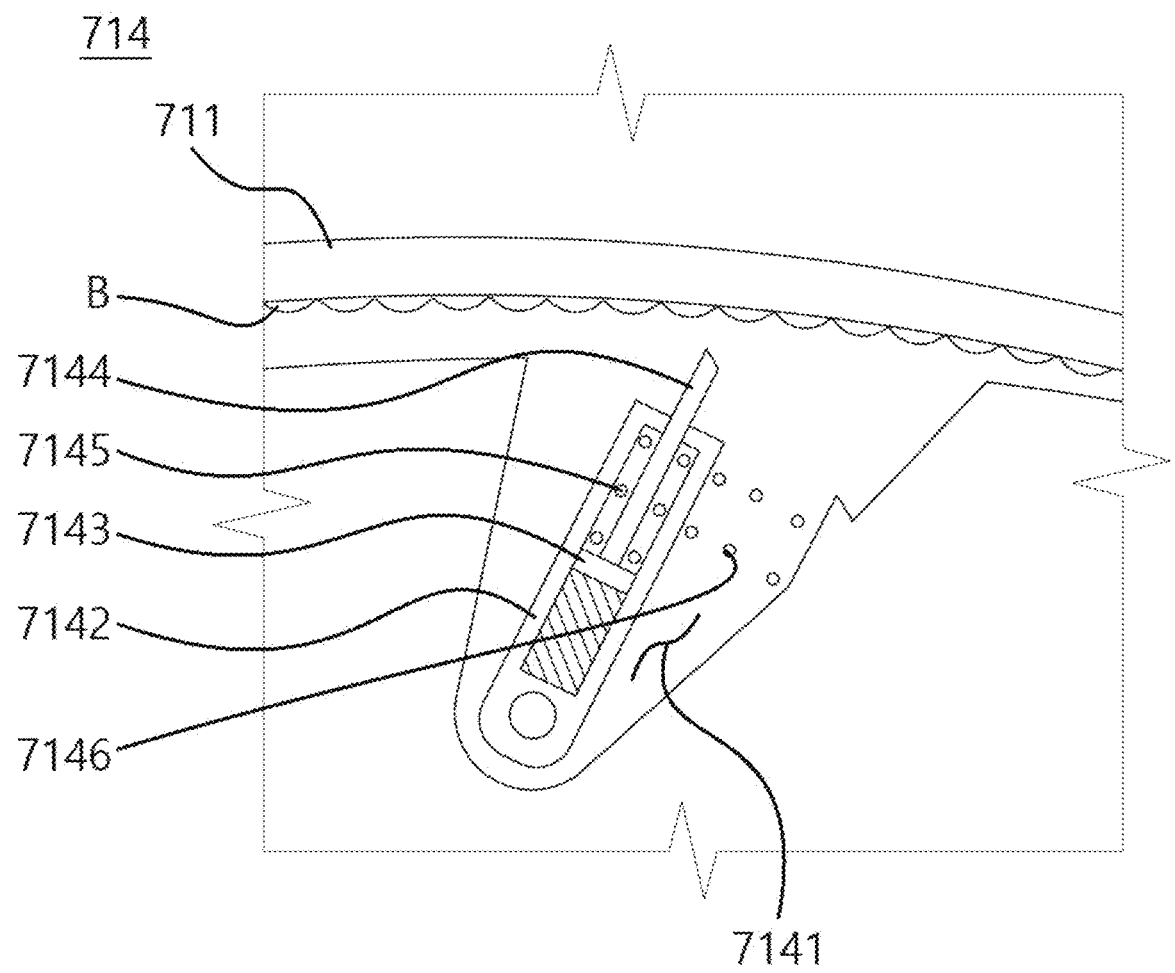
FIGS. 7 and 8 are views illustrating a rotation induction part of FIG. 6.
Figure 8:
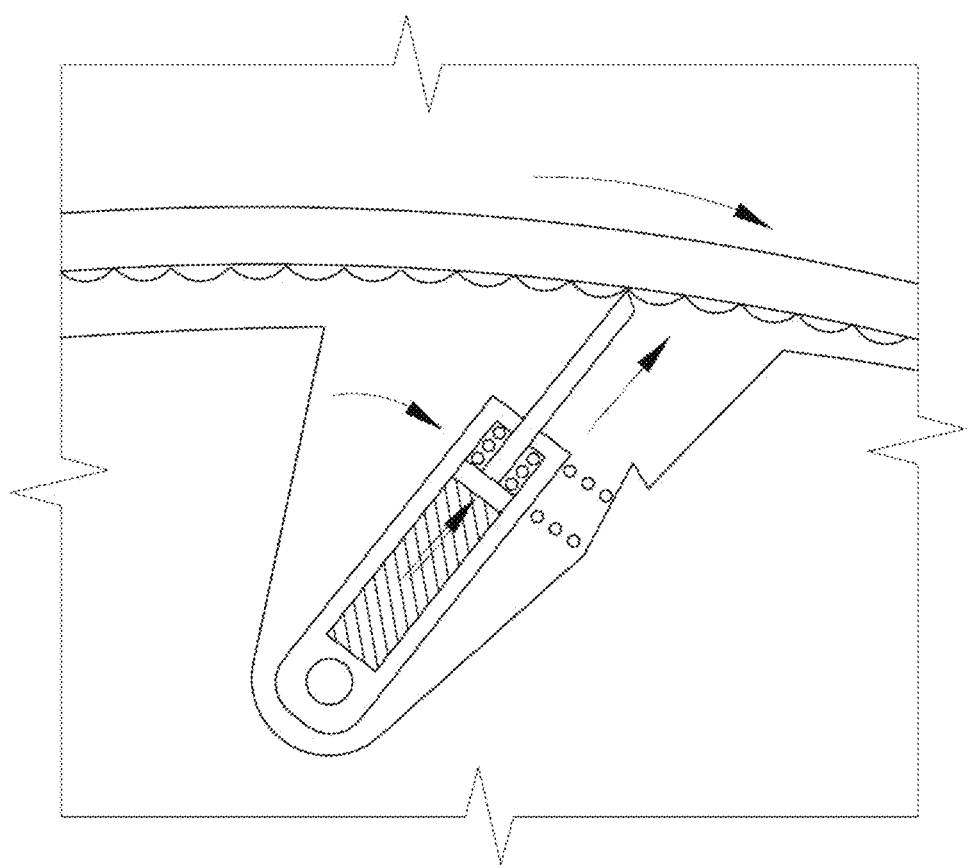

FIGS. 7 and 8 are views illustrating the rotation induction part of FIG. 6.

Referring to FIGS. 7 and 8, the rotation induction part 714 includes a cylinder seating groove 7141, a rotating cylinder 7142, a piston 7143, a piston rod 7144, a first return spring 7145, and a second return spring 7146.

The cylinder seating groove 7141 is formed on the outward surface of the second ring-shaped frame 712 (namely, to have an opening portion wider than an inner face) so as to be rotatable at a predetermined angle (for example, between 5° to 30°).

The rotating cylinder 7142 has one end connected to the inside of the cylinder seating groove 7141 to be rotatable and is arranged to be inclined (i.e., oriented towards the rotation direction of the first ring-shaped frame 711).

The piston 7143 is installed inside the rotating cylinder 7142, is moved forwards as fluid is supplied from the plate support cylinder 7136 to the rotating cylinder 7142, thereby exposing the piston rod 7144 from the rotating cylinder 7142.

The piston rod 7144 is installed at the front end of the piston 7143, has a front end arranged to be exposed forward from the rotating cylinder 7142, is caught to a retaining jaw (B) formed along the inward surface of the first ring-shaped frame 711 as the piston 7143 moves forward inside the rotating cylinder 7142 to be exposed from the rotating cylinder 7142, and then, is pushed to rotate the first ring-shaped frame 711.

The first return spring 7145 is installed at the front end inside the space of the rotating cylinder 7142 to support the front end of the piston 7143 and return the piston 7143 moved forward by hydraulic pressure to its original position.

The second return spring 7146 is installed on one side of the cylinder seating groove 7141 to support one side of the rotating cylinder 7142 and return the rotated rotating cylinder 7142 to its original position.

The rotation induction part 714 having the configuration described above is extended when an external impact is applied to the first ring-shaped frame 711 and forcibly rotates the first ring-shaped frame 711, thereby minimizing vibration or shock that could be transmitted from the first ring-shaped frame 711 to the second ring-shaped frame 712.

Figure 9:
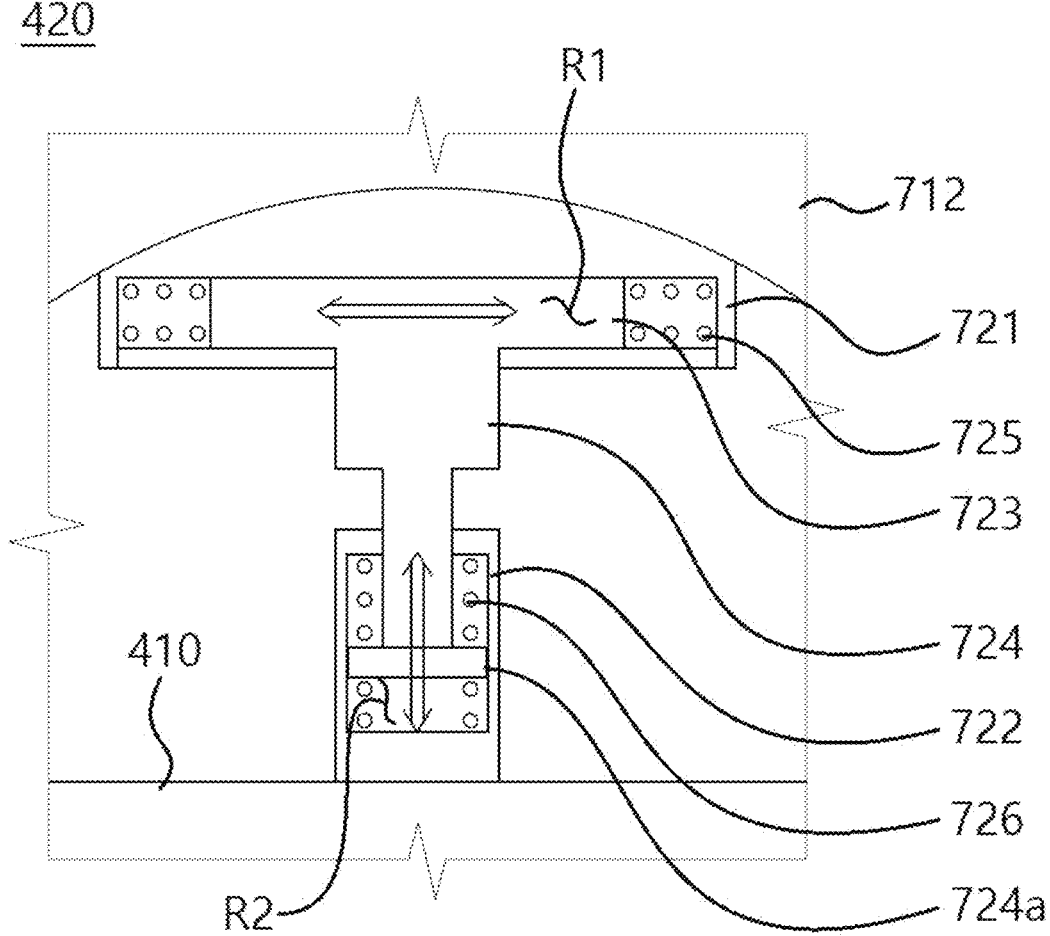
FIG. 9 is a view illustrating a first buffer support part of FIG. 5

FIG. 9 is a view illustrating the first buffer support part of FIG. 5.

Referring to FIG. 9, the first buffer support part 720 includes a horizontal sliding rail 721, a vertical sliding rail 722, a horizontal frame 723, a vertical frame 724, two horizontal support springs 725, and two vertical support springs 726.

Here, the second buffer support part 730, the third buffer support part 740, and the fourth buffer support part 750 have the same configuration as the first buffer support part 720 which will be described later. The horizontal sliding rail 721, the vertical sliding rail 722, the horizontal frame 723, the vertical frame 724, the two horizontal support springs 725, and the two vertical support springs 726 of the first buffer support part 720 can be applied to the second buffer support part 730, the third buffer support part 740, and the fourth buffer support part 750 in the same way, and to avoid repeated description, descriptions of the components will be omitted.

The horizontal sliding rail 721 is installed on the inward surface of the front end of the second ring-shaped frame 712 to face the vertical sliding rail 722.

The vertical sliding rail 722 is installed on the front surface of the gripper body 410 to face the horizontal sliding rail 721.

The horizontal frame 723 is extended in a "—" shape to be connected to a horizontal rail groove (R1) extending in the left-right horizontal direction along the inside of the horizontal sliding rail 721, thereby enabling sliding movement in the left-right horizontal direction.

The vertical frame 724 is extended to be orthogonal in a "|" shape from the rear end of the horizontal frame 723 to be connected to a vertical rail groove (R2) extending in the back-and-forth vertical direction along the inside of the vertical sliding rail 722, thereby enabling sliding movement in the back-and-forth vertical direction.

The two horizontal support springs 725 are respectively installed on both sides of the horizontal rail groove (R1) to support both sides of the horizontal frame 723 seated on the horizontal rail groove (R1).

The two vertical support springs 726 are respectively installed at the front and rear ends of the vertical rail groove (R2). The vertical support springs 726 respectively support the front and rear ends of a frame head 724a installed at the bottom of the vertical frame 724. The frame head 724a is formed to correspond to the cross-sectional shape of the vertical rail groove (R2), is placed on the vertical rail groove R2, and is installed at the bottom of the vertical frame 724.

The first buffer support part 720 having the configuration as described above can not only stably support the first ring-shaped frame 711 and the second ring-shaped frame 712 but also buffer an external impact that may occur in various directions of the first ring-shaped frame 711.

The embodiments described above are for illustrative purposes, and those skilled in the art will understand that these embodiments can be easily modified into different specific forms without changing the technical spirit or essential features of the embodiments. Therefore, the described embodiments should be considered in all respects as exemplary and not restrictive. For example, the components described as single units may be realized in a distributed manner, and likewise, the components described as distributed may be realized in a combined form.

The protective scope of the present invention is defined by the following claims rather than the detailed description above. It should be interpreted to include all changes or modified forms derived from the meaning and scope of the claims and their equivalent concepts.

What is claimed is:

1. A palletizing system comprising:
a system casing which is positioned on one side of a pallet for loading goods;
an actuator lift which is installed above the system casing, and extends or contracts in the vertical direction;
a collaborative robot which is a multi-joint robot formed to load goods onto the pallet, is connected and installed on the top of the actuator lift to be vertically lifted and moved by the actuator lift;
a vacuum suction-type gripper which is installed at the end of the collaborative robot, and fastens goods using vacuum;
radar sensors, which are respectively installed on at least one side of the system casing, and sense objects within a predetermined distance of the system casing; and
a main controller which controls the operations of the actuator lift, the collaborative robot, and the vacuum suction-type gripper to load goods onto the pallet positioned on one side of the system casing, using sensing information transmitted from the radar sensors,
wherein the vacuum suction-type gripper includes:
a gripper body which is installed at the end of the collaborative robot;
a plurality of suction units which is formed in a sucker shape, is installed along the bottom side of the gripper body to fasten goods using vacuum;
an air control valve which sucks air from the suction units to create a vacuum; and
an air pressure switch which senses the negative pressure formed in the suction units and controls the operation of the air control valve,
wherein the vacuum suction-type gripper further includes a collision prevention module which is installed to surround the sides of the gripper body to prevent collision of the gripper body, and
wherein the collision prevention module includes:
a ring-shaped collision prevention part which is formed in a circular ring shape, and is arranged to surround each side of the gripper body;
a first buffer support part which is installed on the front surface of the gripper body to support the inward surface of the front end of the ring-shaped collision prevention part;
a second buffer support part which is installed on one side of the gripper body to support the inward surface of one side of the ring-shaped collision prevention part;
a third buffer support part which faces the second buffer support part and is installed on the opposite side of the gripper body to support the inward surface of the other side of the ring-shaped collision prevention part; and
a fourth buffer support part which faces the first buffer support part and is installed on the rear surface of the gripper body to support the inward surface of the rear end of the ring-shaped collision prevention part.

2. The palletizing system according to claim 1, wherein the system casing has wheels installed along the bottom thereof for movement, and includes a vertically extendable and contractible stand provided along the bottom thereof to allow the position to be fixed after movement.

3. The palletizing system according to claim 1, wherein the radar sensor temporarily stops the collaborative robot when a worker approaches during operation, and resumes the operation of the collaborative robot when the worker moves away.

4. The palletizing system according to claim 1, wherein the air pressure switch is installed on the gripper body to monitor the air pressure of the air control valve.

5. The palletizing system according to claim 1, wherein the ring-shaped collision prevention part comprises:
a first ring-shaped frame which is formed in a circular ring shape, and has an upper end and a lower end which are respectively bent inwards in the horizontal direction and then further bent in the orthogonal direction to face each other;
a second ring-shaped frame which is formed in a circular ring shape, and includes an upper end seating groove extending along the upper end thereof for placing the upper end of the first ring-shaped frame thereon and a lower end seating groove extending along the lower end thereof for placing the lower end of the first ring-shaped frame thereon;
a plurality of frame spacing support parts which are installed along the outward surface of the second ring-shaped frame at regular intervals to support the interval between the inward surface of the first ring-shaped frame and the outward surface of the second ring-shaped frame and to buffer vibration or impact transmitted from the first ring-shaped frame;
a plurality of rotation induction parts which are installed along the outward surface of the second ring-shaped frame at regular intervals, forms a pair with the frame spacing support part, extends in an inclination direction by the frame spacing support parts as the interval between the inward surface of the first ring-shaped frame and the outward surface of the second ring-shaped frame decreases due to an external impact applied onto the first ring-shaped frame, thereby inducing the rotation of the first ring-shaped frame;
a plurality of upper close contact parts which are installed along the upper end seating groove at regular intervals to support the vertical surface of the upper end of the first ring-shaped frame seated on the upper end seating groove; and
a plurality of lower close contact parts which are installed along the lower end seating groove at regular intervals to support the vertical surface of the lower end of the first ring-shaped frame seated on the lower end seating groove.

* * * * *